Patented Feb. 4, 1941

2,230,353

UNITED STATES PATENT OFFICE 2,230,353

DISPERSIBLE PIGMENT COMPOSITION

Jean G. Kern, Buffalo, N. Y., assignor to National Aniline & Chemical Company, Inc., New York, N. Y., a corporation of New York No Drawing. Application January 21, 1939, Serial No. 252,216

16 Claims. (Cl. 8—90)

This invention relates to the art of coloring, and to compositions of matter useful in connection therewith and processes for their manufacture. It relates especially to compositions of matter containing pigments in the solid form which, when added to water, will readily produce a dispersion thereof. The invention also includes processes for making said products.

The art of coloring employs a diversity of materials, many of which are utilized in the form of suspensions in water. A number of said materials are relatively insoluble in water and have the disadvantage that, in dry or powdered form, they are not readily wetted by water and do not readily form suspensions in which the material is sufficiently finely divided to be useful for many purposes. Lake pigments, such as those of the alizarine lake type, and those formed by the combination of a basic dye with a hetero-polyacid containing a plurality of radicals of phosphorus, tungsten, molybdenum, and silicon, and especially those which are formed by the combination of a basic dye with a phosphometal acid (for example, phosphotungstic acids, phosphomolybdic acids, phosphotungstomolybdic acids) and the like complex acids, are outstanding examples of materials of this type. Other instances of such materials are inorganic pigments and insoluble azo compounds.

It has heretofore been proposed to place such substances on the market in the form of aqueous suspensions or pastes. Such aqueous suspensions have a number of disadvantages, however, from the standpoint of economy. Thus, care must be exercised in their transportation to avoid loss of material by leakage; precautions must be taken in winter to prevent freezing; the water in the paste, which has no coloring action, occupies considerable bulk and adds to the weight of the material, thereby adding to the cost of transportation and handling; and care must be exercised in the storage of the paste to avoid drying out with formation of an insoluble crust which does not redisperse and which renders the paste non-uniform and specky.

In the preparation of a pigment composition in accordance with the present invention, an aqueous dispersion or suspension is formed containing the pigment in a suitably dispersed form, and a readily soluble salt of an acid alkyl ester of an inorganic polybasic acid, more fully identified hereinafter, or a plurality of such salts, are dissolved in the resulting dispersion or suspension, with or without the addition of fillers, dispersing agents and/or other substances desired in the final product; and water is removed from the resulting mixture, preferably with agitation. There are thus obtained pigment compositions in which the water has been displaced in whole or in part by the alkyl ester salt.

The present invention is based upon the discovery that the soluble salts of the hereindescribed acid alkyl esters of polybasic inorganic acids possess a combination of properties which render them of especial value for the production and manufacture of lake pigments and related compositions in the solid form, and especially in the form of powders. Thus, the soluble salts of the hereindescribed acid alkyl esters of inorganic polybasic acids, and especially of sulfuric acid, have the faculty of rapidly entering into solution in water and other aqueous suspension media usually employed in the art of coloring, whereby they cause the pigment particles to be disintegrated rapidly and thereby enable the said particles to be more readily dispersed when the pigment compositions are added to said media.

The soluble salts of the acid alkyl esters which may be employed in accordance with the present invention include all soluble salts of certain acid alkyl esters of inorganic polybasic acids; namely, the acid alkyl esters consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 5 carbon atoms. Thus, they include all soluble salts of partial esters of polybasic inorganic acids, more particularly those of sulfuric, boric, phosphoric and thiophosphoric acids, and especially those of sulfuric and phosphoric acids, containing at least one organic (ester) radical which is an alicyclic radical (cyclo-aliphatic hydrocarbon radical, which may be saturated or unsaturated and which may contain substituents) or is an open-chain hydrocarbon radical (straight-chain, branched-chain, saturated or unsaturated) which contains a maximum of 5 carbon atoms in the hydrocarbon radical but which may contain one or more inorganic substituents (as for example, a hydroxyl group, an amino group, an imino group, a sulfo group, a sulfate group, a phosphate group, a borate group, etc.) and/or one or more organic substituents of the alicyclic, heterocyclic or aromatic series (whether they are uniform or hybrid members of these series) and/or one or more lower open-chain aliphatic, alicyclic or aromatic substituents (which may be further substituted by inorganic and/or organic substituents) linked to said open-chain hydrocarbon radical by an inorganic atom (as for example, oxygen, sulfur, nitrogen, etc.). These partial esters (which are herein designated as "acid alkyl esters") may be represented by the formula

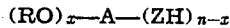
(RO)$_x$—A—(ZH)$_{n-x}$ in which R represents an alicyclic hydrocarbon radical or an open-chain hydrocarbon radical which contains not more than 5 carbon atoms, which radical may contain a substituent other than an aliphatic hydrocarbon radical, Z represents an oxygen or a sulfur atom, A represents the residue of the inorganic acid (as for example, the radical SO$_2$, the radical PO, the radical PS, B, etc.), $n$ represents the number of hydrogen atoms which are replaceable by a metal (herein designated as "replaceable hydrogen atoms") that are present in the uncombined polybasic acid from which the ester is derivable, and $x$ is one or more but not greater than $n-1$. As is well known a partial ester (acid alkyl ester) of a polybasic inorganic acid is an ester in which at least one of the replaceable hydrogen atoms of the parent polybasic inorganic acid has not been replaced by an organic radical.

It is to be noted, in the case of acid polyalkyl esters of polybasic acids containing 3 or more replaceable hydrogen atoms, in which more than one of said hydrogen atoms have been replaced by organic radicals, the said organic radicals (represented by R in the above formula) may be the same or different.

Any suitable metal or base, including the organic bases, may be combined with the said acid alkyl esters to form the acid alkyl ester salts employed in accordance with the present invention, provided the resulting salts possess good solubility and also preferably a finely crystalline or amorphous form in the solid state. For example, alkali metal, alkali earth metal, zinc, magnesium, ammonium, etc. salts may be employed. Further, organic bases such as urea, guanidine, certain alkylamines (particularly the hydroxyalkyl amines), pyridine, etc., may be employed to form salts (as for example, quaternary ammonium salts) of said acid alkyl esters.

The alkyl ester salts employed in accordance with the present invention may be prepared in any manner well known to the art; as for example by the treatment of the corresponding monohydric or polyhydric alcohol, hydroxyalkyl ether, hydroxyalkyl amine, etc., in the presence or absence of a solvent or diluent, with a suitable inorganic reagent (such as phosphorus chloride or oxychloride, concentrated sulfuric acid and/or chlorsulfonic acid, etc.), and neutralization of the resulting acid alkyl ester with an inorganic or organic base which forms a readily soluble salt with said acid alkyl ester. It may be noted that the monoalkyl sulfuric acids resulting from the use of sulfuric acid may contain varying amounts of sulfonic acids which are sometimes produced due to secondary reactions; the presence of such sulfonic acids, however, does not impair the usefulness of the monoalkyl sulfuric acids in accordance with the present invention.

As illustrating various types of acid alkyl esters, the soluble salts of which may be employed in accordance with the present invention, the following may be mentioned:

Derivatives of alicyclic alcohols; as for example, the acid alkyl esters which may be derived on the one hand from such acids as sulfuric, boric and phosphoric acids and on the other hand from such alcohols as cyclohexyl alcohol, dihydroxy cyclohexane, ethyl cyclohexyl alcohol, cyclopentyl alcohol, methyl cyclopentyl alcohol, 2-amino cyclohexanol, piperidine beta-carbinol, pyrrolidine alpha-carbinol, etc.

Derivatives of open-chain monohydric aliphatic alcohols which contain not more than 5 carbon atoms and which are free from substituents in the alkyl group; as for example, the monoethyl, propyl, butyl and amyl sulfuric acids, the mono- and di-ethyl, propyl, butyl and amyl phosphoric and boric acids, diamyl dithiophosphoric acid, etc.

Derivatives of open-chain aliphatic polyhydric alcohols which contain not more than 5 carbon atoms; as for example, the mono-glycol and mono-glycerine sulfuric, boric and phosphoric acids, the diglycol and diglycerin monophosphoric acids, the glycol and glycerin disulfuric, diphosphoric and triphosphoric acids, diglycerin boric acid, etc.

Derivatives of alkyl, aralkyl and aryl ethers of open-chain aliphatic polyhydric alcohols in which the alkyl group linked to the inorganic polybasic acid contains not more than 5 carbon atoms, and obtainable for example, by sulfonation or phosphation of said ethers; as for example, alkyl ethers of glycol and glycerin sulfuric and phosphoric acids (such as, the monoethyl ether of glycol sulfuric acid: CH$_3$CH$_2$OCH$_2$CH$_2$OSO$_3$H, the mono-isopropyl ether of glycol sulfuric acid, the monobutyl ether of glycol sulfuric acid, diethylene glycol disulfuric acid:

HO$_3$SOCH$_2$CH$_2$OCH$_2$CH$_2$OSO$_3$H)

alkyl ethers of polyglycol and polyglycerin sulfuric, boric and phosphoric acids (such as the mono-methyl, mono-ethyl, etc. ethers of diethylene glycol sulfuric acid:

AlkOCH$_2$CH$_2$OCH$_2$CH$_2$OSO$_3$H wherein Alk represents methyl, ethyl, etc. radicals which may contain substituents, as for example, halogen atoms or hydroxyl, sulfo or carboxyl groups, etc.), aryl ethers of glycol and glycerin sulfuric, boric and phosphoric acids (such as, the 2-nitro-4-methyl-phenyl ether of glycol sulfuric acid:

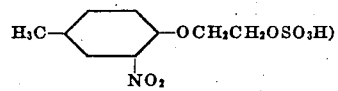

etc.

Derivatives of hydroxyalkyl amines of various kinds in which the alkyl group linked to the inorganic polybasic acid contains not more than 5 carbon atoms; for example, amino alkyl sulfuric acids which are included within the formulas:

R$_2$N(CH$_2$)$_n$OSO$_3$H and

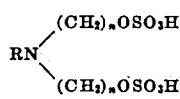

wherein R represents a hydrogen atom or the same or different alkyl groups or substituted alkyl groups or aryl groups or substituted aryl groups and $n$ is from 2 to 5 (such as, amino ethyl sulfuric acid: H$_2$NCH$_2$CH$_2$OSO$_3$H, N-mono-normal-butyl amino ethyl sulfuric acid:

CH₃CH₂CH₂CH₂NHCH₂CH₂OSO₃H the acid sulfuric ester of N-di(hydroxyethyl) 2-ethyl-cyclohexylamine, the sulfuric ester of N-mono-hydroxyethyl 2-ethyl-cyclohexylamine, the sulfuric ester of N-mono-hydroxyethyl cyclohexylamine, the sulfuric ester of N-di(hydroxyethyl) cyclohexylamine, the sulfuric ester of N-hydroxyethyl tetrahydronaphthylamine, the sulfuric ester of N-hydroxyisopropyl normal-butylamine, the sulfuric ester of the monohydroxyethyl ether of N-hydroxyethyl di-normal-butylamine:

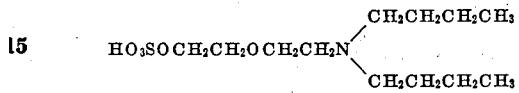

etc.) or their corresponding phosphoric or boric acid derivatives (such as, the acid phosphoric ester of N-hydroxyisopropyl cyclohexylamine), etc.; which may be obtained, for example, by reacting a strong oxygen-containing polybasic inorganic acid (such as sulfuric acid, phosphoric acid, sulfur trioxide, chlorsulfonic acid, phosphorous oxychloride, etc.) with a saturated or unsaturated, open-chain or cyclic, aliphatic amine, mixed open-chain aliphatic-cycloaliphatic amine, or a mixed open-chain aliphatic-aromatic amine, and particularly one which contains from 2 to 5 carbon atoms in an uninterrupted carbon chain and at least 1 hydroxy group or olefinic double bond or both, as well as substitution products thereof (such as, hydroxy derivatives of said amines, hydroxy alkyl ethers of said amines, etc.), or by the action of concentrated sulfuric acid upon hydroxy alkyl derivatives of aromatic amines and diamines (such as, N-hydroxyethyl aniline, N-di(hydroxyethyl) aniline, N-hydroxyethyl o-toluidine, N-hydroxyethyl N-benzyl aniline, N-hydroxyethyl alpha- or beta-naphthylamine, N-hydroxyethyl ortho-, meta- or para-diamines, N-hydroxyethyl aminophenols or amino-naphthols (cf. British Patent 181,750), etc.

Mixtures of said salts of said acid alkyl esters may also be employed in accordance with the present invention, as for example the salts of suitable inorganic or organic bases with the commercially available and cheap mixtures of alkyl sulfuric acids resulting from the sulfuric acid treatment of gaseous and lighter liquid unsaturated hydrocarbons, such as the mixtures produced in the recovery and removal of unsaturated hydrocarbons in the production and purification of gasoline in the so-called "cracking" process of petroleum distillation.

In order that the compositions may be in a more satisfactory form for subsequent use, the mixture of pigment in aqueous dispersion and alkyl ester salt, together with the other substances, if added, are preferably evaporated with agitation with or without the aid of vacuum, and preferably at a temperature not exceeding 100° C. Thus, the mixture may be evaporated to dryness on an atmospheric or vacuum rotary drum drier, preferably at a temperature not exceeding 100° C., and the dry product scraped off in the form of flakes, scales or grains which may be used as such; or the mixture with or without preliminary evaporation, may be admixed with a suitable hydrate-forming soluble salt in an anhydrous condition and the admixture stirred to produce a dry product. If desired, the dry products may be disintegrated into a powder in any suitable manner, as for example by grinding in a ball mill, and subsequently screened.

Inasmuch as the quality and dispersibility of the resulting composition is dependent to a considerable extent upon the original degree of dispersion of the pigment in the suspension before drying, the pigment is preferably employed in the highly dispersed form. A suitable dispersing agent is accordingly preferably incorporated into the pigment suspension so as to aid in preventing precipitation of the particles during the drying, and to increase the fluidity and render easier the incorporation of the alkyl ester salt. Among the dispersing agents which may be employed for this purpose there may be mentioned for example, the sulfonic acids of benzene, hydroxybenzenes, naphthalene, hydroxynaphthalenes, their nuclear alkyl, nuclear aralkyl and hydrogenated derivatives, as well as aldehyde condensation products thereof (as for example 2.6-naphthalenedisulfonic acid, 1.7-naphthalene-disulfonic acid, 2.8-naphthalenedisulfonic acid, isopropyl-naphthalenesulfonic acids, dibutylnaphthalenesulfonic acids, amylnaphthalenesulfonic acids, butylbenzylnaphthalenesulfonic acids, cyclohexylnaphthalenesulfonic acids, methylene-di (beta-naphthalenesulfonic acid), acetal-di (beta-naphthalenesulfonic acid), benzal-di (beta-naphthalenesulfonic acid), methylene-di (diisopropyl-naphthalenesulfonic acid), etc.; sulfite cellulose waste liquors and their mildly oxidized products and evaporated residues; sulfonated resins; abietene, abietine and abietane sulfonic acids; soaps, sulfonated higher fatty acids, fats and oils; sulfuric acid esters of hydroxy-fatty acid esters of monohydric alcohols; and the like, as well as mixtures of two or more of such substances.

If desired, additional substances having diluent or other suitable action in the subsequent use of the compositions may be incorporated into the compositions of the present invention, preferably while the latter are in the form of aqueous suspensions.

The amount of salt of the acid alkyl ester employed in the preparation of the compositions of the present invention may be varied over a considerable range, depending in part upon the concentration of pigment in the composition, the use to which the composition is to be put, and whether or not other diluents and other materials are included in the composition. For example, an ideal composition in dry form is obtained by replacing all of the water in an aqueous paste or suspension of the pigment with an equal amount of alkyl ester salt, in which case the composition of the powder may be for example:

| | Per cent |
|---|---|
| Pigment (actual solids) | 10–20 |
| Dispersing agent (e. g. "Leukanol") | 1–2 |
| Acid alkyl ester salt | 89–78 |

While a powder composition having such a large content of the alkyl ester salt is an extremely advantageous product, in that it is applicable for the preparation of pigments of all classes in the powdered form, it is frequently unnecessary to employ such large amounts of said salt. For example, when the powder is to be employed for the preparation of a paste useful for the coloring of paper and the like, only a sufficient amount of the alkyl ester salt need be employed which will produce the desired dispersion of the powder when added to water. Furthermore, by including diluents and fillers in the composition, a much smaller amount of the alkyl ester salt may be used, inasmuch as the presence of a relatively small quantity of the salt is effective in overcoming the disadvantageous properties of the diluents and fillers previously known and used. As a result, a part of the alkyl ester salt may be replaced in the composition by less expensive diluents and fillers.

As diluents and fillers many known products may be used. For example, the carbohydrates are quite suitable, such as sucrose (ordinary cane or beet sugar), cerelose (or corn sugar), etc. Further, dextrines, glue, gelatin, gum arabic, or other substances included in the general class of so-called "protective colloids" also may be used, as well as other products which do not cause precipitation of suspended pigment particles or otherwise produce specky pastes (as for example, urea, various other highly soluble amides, etc.).

It is evident from the above disclosure that soluble salts of various acid alkyl esters may be employed in the practice of the present invention. Alkyl ester salts in which the alkyl radical is an open-chain hydrocarbon radical containing from 3 to 5 carbon atoms are preferred, however.

The invention will be further described in connection with the following specific examples, which are given to illustrate the invention. It will be realized, however, that the invention is not limited thereto but that changes may be made in the materials treated and their proportions, manipulative steps, and other conditions without departing from the scope of the appended patent claims. The parts are by weight, unless otherwise indicated. Parts by volume are in the relation of liters to kilograms to the parts by weight.

*Example 1.*—100 parts of Helio Fast Pink RL, containing 25.3 per cent of dye solids in the form of an aqueous suspension, 2 parts of Leukanol, 30 parts of normal amyl sodium sulfate, 20 parts of soluble dextrine, and 23 parts of cane sugar are mixed until all soluble material is dissolved, and the mixture is evaporated to dryness, ground, and screened. The resulting product may be used for tinting textiles, paper, and the like in the form of an aqueous dispersion, and possesses high coloring power in view of the excellent dispersibility of the powder. The powder is also of excellent utility in the making of lakes. In a similar manner other azo dye pigments may be obtained in the form of a readily dispersible powder, as for example, Helio Fast Red RL (Color Index No. 69), etc. The normal amyl sodium sulfate may be replaced by any of the other alkyl ester salts herein disclosed.

Dye powders for use in making lakes may also be obtained in a manner similar to that hereinbefore given by bringing the aqueous paste containing the dye and acid alkyl ester salt to dryness with the aid of a hydrate-forming soluble salt in an anhydrous condition, as for example anhydrous or partially dehydrated aluminum sulfate. In this connection it is to be noted that the particular hydrate-forming soluble salt employed should be chosen with a view to the subsequent use of the product. Thus, when the product is to be used in an acidic medium, as for example in the formation of certain lakes, the hydrate-forming salt preferably should be selected from the class of alkali earth metal and heavy metal salts of strong acids.

*Example 2.*—1000 parts of phosphotungstic toner pulp of Methylene Blue, an aqueous suspension of the phosphotungstic acid lake of Methylene Blue containing 18.7 per cent of solids, are thoroughly dispersed with 19 parts of Leukanol. The following ingredients are then added:

| | Parts |
|---|---|
| Soluble dextrine dissolved in 600 parts of water | 554 |
| Ethylene glycol disodium disulfate dissolved in 200 parts of water | 46 |
| Isobutyl sodium surfate dissolved in 200 parts of water | 61 |

The resulting mixture is evaporated to dryness, ground, and screened through a 60-mesh screen. A powder of excellent dispersibility is obtained.

*Example 3.*—To 1200 parts of phosphotungstic toner pulp of Methyl Violet, an aqueous suspension of the phosphotungstic acid lake of Methyl Violet containing 13 per cent of solids, are added under thorough agitation:

| | Parts |
|---|---|
| Leukanol | 19.2 |
| Soluble dextrine previously dissolved in 400 parts of water | 311.2 |
| Ethylene glycol disodium disulfate previously dissolved in 200 parts of water | 62.4 |
| Isobutyl sodium sulfate previously dissolved in 200 parts of water | 62.4 |

The mixture is further treated as in Example 2. A violet powder of excellent dispersion and great tinctorial strength is obtained.

*Example 4.*—1000 parts of phosphotungstic toner paste of Rhodamine B, an aqueous suspension of the phosphotungstic acid lake of Rhodamine B, are well dispersed by thoroughly mixing with 30 parts by volume of a 50 per cent (by volume) solution of Leukanol. Thereafter 890 parts by volume of a 50 per cent (by volume) solution of soluble dextrine, and 400 parts by volume of a 25 per cent (by volume) solution of ethylene glycol dipotassium disulfate are added. On evaporation to dryness followed by grinding, a powder of excellent dispersibility is produced.

In the above examples, the ethylene glycol disulfate salt and the isobutyl sodium sulfate may be replaced by any of the alkyl ester salts herein disclosed.

The same procedure applies to the manufacture of any color lake or pigment, whether of organic or mineral origin; e. g., Lead Chromate Yellow, toners produced from sparingly soluble or insoluble organic dyestuffs (azo mainly), alizarine lakes, spirit-soluble color lakes, etc. Thus, the phosphotungstic toner pastes or press-cakes of the above examples may be replaced by any color lake press-cake, dispersion being effected with an additional dispersing agent (e. g., Leukanol) if necessary, mixing, drying, and grinding being accomplished in a similar way without departing from the spirit of the invention.

The phosphotungstic and other lakes may be prepared in any suitable or well known manner. Thus, the phosphotungstic acid lakes conveniently may be prepared according to the procedure given in U. S. P. 1,378,882.

This application is a continuation-in-part of my application Serial No. 673,031, filed May 26, 1933, now United States Patent 2,145,193.

I claim:

1. A composition of matter in solid form adapted on addition to water to disintegrate and disperse rapidly, comprising a pigment and a soluble salt of an acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 5 carbon atoms.

2. A composition of matter in solid form adapted on addition to water to disintegrate and disperse rapidly, comprising a pigment and an alkali metal salt of an acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 5 carbon atoms.

3. A composition of matter in solid form adapted on addition to water to disintegrate and disperse rapidly, comprising a pigment, and a soluble salt of an acid alkyl ester of sulfuric acid, in which the alkyl radical is free from open-chain hydrocarbon radicals containing more than 5 carbon atoms.

4. A composition of matter in solid form adapted on addition to water to disintegrate and disperse rapidly, comprising an insoluble azo coloring matter, as the principal coloring constituent, and an alkali metal salt of an acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 5 carbon atoms.

5. A composition of matter in solid form adapted on addition to water to disintegrate and disperse rapidly, comprising an insoluble azo coloring matter, as the principal coloring constituent, and an alkali metal salt of an acid alkyl ester of sulfuric acid in which the alkyl radical is free from open-chain hydrocarbon radicals containing more than 5 carbon atoms.

6. A composition of matter in solid form adapted on addition to water to disintegrate and to disperse rapidly, comprising a lake pigment, as the principal coloring constituent, and a soluble salt of an acid alkyl ester of an inorganic polybasic acid, said acid alkyl ester consisting, on the one hand, of a radical of an inorganic polybasic acid in which at least one of the replaceable hydrogen atoms is present, and, on the other hand, of one or more organic radicals directly linked to the inorganic radical, said organic radicals being free from open-chain hydrocarbon radicals containing more than 5 carbon atoms.

7. A composition of matter in solid form adapted on addition to water to disintegrate and to disperse rapidly, comprising a lake pigment, as the principal coloring constituent, and a soluble salt of an acid alkyl ester containing not more than 5 carbon atoms in a carbon to carbon chain and derivable from a polybasic inorganic acid and an aliphatic alcohol containing not more than 5 carbon atoms.

8. A composition of matter in solid form adapted on addition to water to disintegrate and to disperse rapidly, comprising a lake pigment of the basic dye-phosphometal type, as the principal coloring constituent, and an alkali metal salt of an acid alkyl ester of an inorganic polybasic acid, said acid alkyl ester consisting, on the one hand, of a radical of an inorganic polybasic acid selected from the group consisting of sulfuric and phosphoric acids, in which at least one of the replaceable hydrogen atoms is present, and on the other hand, of one or more organic radicals directly linked to the inorganic radical, said organic radicals being free from open-chain hydrocarbon radicals containing more than 5 carbon atoms.

9. A composition of matter in solid form adapted on addition to water to disintegrate and to disperse rapidly, comprising a lake pigment of the basic dye-phosphometal type, as the principal coloring constituent, and a soluble salt of an acid alkyl sulfate containing not more than 5 carbon atoms in the alkyl group.

10. A composition of matter in the dry solid form adapted on addition to water to disintegrate and to disperse rapidly, comprising a lake pigment of the basic dye-phosphometal type, as the principal coloring constituent, and an alkali metal salt of an acid alkyl sulfate containing not more than 5 carbon atoms in the alkyl group.

11. A composition of matter in solid form adapted on addition to water to distintegrate and to disperse rapidly, comprising a lake pigment of the basic dye-phosphometal type, as the principal coloring constituent, and a soluble salt of an acid alkyl ester containing a maximum of 5 carbon atoms in the alkyl group and derivable from a polybasic inorganic acid and a polyhydric alcohol containing a maximum of 5 carbon atoms.

12. A composition of matter in the dry solid form adapted on addition to water to disintegrate and to disperse rapidly, comprising a lake pigment of the basic dye-phosphometal type, as the principal coloring constituent, and an alkali metal salt of an acid alkyl ester containing a maximum of 5 carbon atoms in the alkyl group and derivable from a polyhydric alcohol containing a maximum of 5 carbon atoms and a polybasic inorganic acid selected from the group consisting of sulfuric and phosphoric acids.

13. A composition of matter in solid form adapted on addition to water to disintegrate and to disperse rapidly, comprising a lake pigment of the basic dye-phosphometal type, as the principal coloring constituent, and an alkali metal salt of an acid alkyl ester of sulfuric acid in which the alkyl radical is derivable from a glycol containing not more than 5 carbon atoms.

14. A composition of matter in solid form adapted on addition to water to disintegrate and disperse rapidly, comprising a lake pigment, as the principal coloring constituent, and an alkali metal salt of isobutyl sulfate.

15. A composition of matter in solid form adapted on addition to water to disintegrate and disperse rapidly, comprising a lake pigment, as the principal coloring constituent, and an alkali metal salt of ethylene glycol disulfate.

16. A composition of matter in solid form adapted on addition to water to disintegrate and disperse rapidly, comprising an insoluble azo coloring matter, as the principal coloring constituent, and an alkal metal salt of isobutyl sulfate.

JEAN G. KERN.